United States Patent [19]
McDonald

[11] Patent Number: 5,673,757
[45] Date of Patent: Oct. 7, 1997

[54] GROUND OPENING DEVICE

[75] Inventor: James Hodgson McDonald, Palmerston North, New Zealand

[73] Assignee: Vibra Blade New Zealand Limited, Palmerston North, New Zealand

[21] Appl. No.: 491,881

[22] PCT Filed: Dec. 23, 1993

[86] PCT No.: PCT/NZ93/00131

§ 371 Date: Jun. 23, 1995

§ 102(e) Date: Jun. 23, 1995

[87] PCT Pub. No.: WO94/14312

PCT Pub. Date: Jul. 7, 1994

[30] Foreign Application Priority Data

Dec. 23, 1992 [NZ] New Zealand .................. 245598

[51] Int. Cl.$^6$ .......................... A01C 5/06; A01B 15/16; A01B 39/10; A01B 49/04
[52] U.S. Cl. .............. 172/90; 172/531; 111/158; 111/167
[58] Field of Search ............. 172/518, 528, 172/541, 603, 604, 90, 61, 538, 531; 111/157, 163, 167, 168, 158

[56] References Cited

U.S. PATENT DOCUMENTS

| | | | |
|---|---|---|---|
| 1,165,735 | 12/1915 | Wentz | 172/603 |
| 5,038,868 | 8/1991 | Rinelli | 172/120 |

FOREIGN PATENT DOCUMENTS

| | | | |
|---|---|---|---|
| 488692 | 5/1976 | Australia | A01C 5/06 |
| 518030 | 5/1979 | Australia | A01C 7/20 |
| 509410 | 9/1979 | Australia | A01B 49/06 |
| 34297/78 | 9/1979 | Australia | A01B 49/06 |
| 547538 | 5/1985 | Australia | A01C 05/06 |
| 0214956 | 3/1987 | European Pat. Off. | A01B 33/02 |
| 0481538 | 4/1992 | European Pat. Off. | |
| 0540955 | 5/1993 | European Pat. Off. | A01C 5/06 |
| 754297 | 11/1933 | France | |
| 1170523 | 1/1959 | France | |
| 1276167 | 10/1961 | France | |
| 2287838 | 5/1976 | France | |
| 181827 | 9/1978 | New Zealand | 31/26 |
| 197549 | 5/1985 | New Zealand | |
| 0034205 | 1/1913 | Switzerland | 111/168 |
| 1395157 | 3/1986 | U.S.S.R. | A01B 39/10 |
| 94/14312 | 7/1994 | WIPO | 111/157 |

Primary Examiner—Terry Lee Melius
Assistant Examiner—Christopher J. Novosad
Attorney, Agent, or Firm—Baker, Maxham, Jester & Meador

[57] ABSTRACT

A ground opening device intended for use with agricultural apparatus is disclosed. The device has a rotatable cutting element and a mounting means. The rotatable cutting element has a cutting edge which forms a narrow groove in the ground when the cutting element is rotated. The cutting element is arranged such that its cutting edge oscillates in two directions simultaneously: in a direction substantially transverse to the groove being formed in the ground and in a direction substantially vertical with respect to the ground surface.

8 Claims, 4 Drawing Sheets

GROUND OPENING DEVICE

TECHNICAL FIELD

This invention relates to a ground opening device.

More particularly the present invention relates to a ground opening device which is primarily intended for use with agricultural apparatus. The ground opening device forms a channel in the ground, into which seeds and/or fertilizer/pesticide, herbicide, nutrients or other substances can be fed.

BACKGROUND OF INVENTION

Generally know ground opening devices may be mounted by a machine (tractor) towable frame. A means of directing the seeds or other material into the channel may be associated with a ground opening device. A trailing press wheel for closing the channel may also be provided. Often a tine will follow the ground opening device to fully form or open up the channel to accept seeds dropped therein by the seed sowing mechanism.

Unfortunately known ground opening devices have some disadvantages.

One disadvantage with existing ground opening devices is the build up of "trash" around the cutting element or wheel which forms the cutting element of the opening device. This build up of trash can significantly inhibit correct operation of the device as the build up can prevent the cutting element from freely rotating as is required for correct operation.

It is known to provide mechanisms such as, for example, scrapers to help avoid this problem. Scrapers may be associated with the cutting element to remove or prevent trash build up. While such scraper mechanisms have in part been successful in moving trash build up away from the cutting element, the scraper mechanisms themselves have, over time, resulted in incorrect operation by, for example, fouling with a bent or warped cutting element.

In addition, the construction and arrangement of known ground opening devices is such that a clean cut in the ground is not achieved. Associated with this failure to provide a clean cut is the forcing by the cutting element of trash into the channel. If this trash is not removed by a following tine or similar device a friable seed bed is not achieved. Furthermore the trash pushed into the channel can result in seeds or other material fed into the channel being forced out of the channel or not being placed at the optimum depth within the channel.

DISCLOSURE OF THE INVENTION

The object of the present invention is to provide a ground opening device which goes some way in reducing these disadvantages or which at least provides the public with a useful choice.

In one aspect the invention comprises a ground opening device including a rotatable cutting element having a cutting edge and rotatably mounted on the device by a rotatable shaft so that the cutting edge is engagable with and cuts into the ground, characterized in that the rotatable shaft is constructed such that the axis of the end of the shaft on which the cutting element is secured is offset from the axis of the main body of the shaft such that the centre of the cutting element is offset with respect to the axis of the main body of the shaft.

In a preferred form of the invention the rotatable cutting element comprises a cutting element, wheel or similar device and is mounted for free rotation on an axle or shaft.

An important aspect of the invention is that the cutting element is not fixed to the shaft but is mounted on a bearing. Hence the cutting element is free running. That is, the cutting element is not driven by the crank shaft. The shaft merely induces the vertical and transverse movement.

Preferably, the cutting edge is adapted to oscillate simultaneously in a direction substantially transverse and in a direction substantially vertical with respect to the ground surface.

Preferably a driving means is coupled to the shaft. Preferably the driving means causes the axle or shaft to be driven with the direction of rotation contrary to the direction in which the cutting element, wheel or similar device would rotate if placed in contact with the ground and drawn therealong during normal forward progress of equipment incorporating the ground opening device.

The cutting element of the ground opening device may be adapted to be attached by a shaft to a drag arm of a vehicle such as a tractor.

Due to the cutting element being set at an angle inclined from the plane perpendicular to the axis of the shaft, the cutting element, as it rotates, oscillates in a direction substantially transverse to the direction in which a groove is being formed.

Preferably the degree of vertical movement of the cutting element is about 4–4½ mm.

Preferably the degree of transverse movement of the cutting element is about 1 mm.

The degree of offset between the axis through the centre of the cutting element and the axis of the main body of the shaft may be about 2 mm.

The degree of offset between the axis through the centre of the cutting element and the axis of the main body of the shaft may be varied to alter the width of the transverse movement of the cutting element and thus the width of the groove formed.

A seed sowing or fertilizer/pesticide or nutrient feeding means may follow the ground opening device.

A compacting means may be provided behind the ground opening device. A compacting means may follow a seed sowing or fertilizer/pesticide nutrient feeding means.

The compacting means may close and flatten the groove formed by the ground opening device.

The compacting means may comprise three wheels. Two leading wheels may form a covering or closing means, whilst a third, trailing wheel, may provide a flattening means. The leading two wheels may be angled towards one another at their lower edges to toe out and gather soil towards the groove and thus help clear the groove. The third wheel may then level or flatten the soil over the groove.

The movement or oscillation in a direction substantially transverse to the length of the groove formed may cause vibration which may be transmitted to the compacting means. This would reduce the weight of wheels needed to compact the soil and close the cut or groove formed.

A depth control means may be provided. This may comprise, for example, a wheel adjustable to varying heights to alter the depth of penetration into the soil of the cutting means.

The invention also provides a method of forming an opening in the ground with a ground opening device comprising the steps of drawing a rotatable cutting element having a cutting edge over the surface of the ground with sufficient down pressure to cause the cutting edge to cut into the ground, said rotatable cutting element being mounted on the device by a rotatable shaft whereby the rotatable shaft is constructed such that the axis of the end of the shaft on which the cutting element is secured is offset from the axis of the main body of the shaft such that the centre of the cutting element is offset with respect to the axis of the main body of the shaft.

BEST MODE OF CARRYING OUT THE INVENTION

Figure 1:
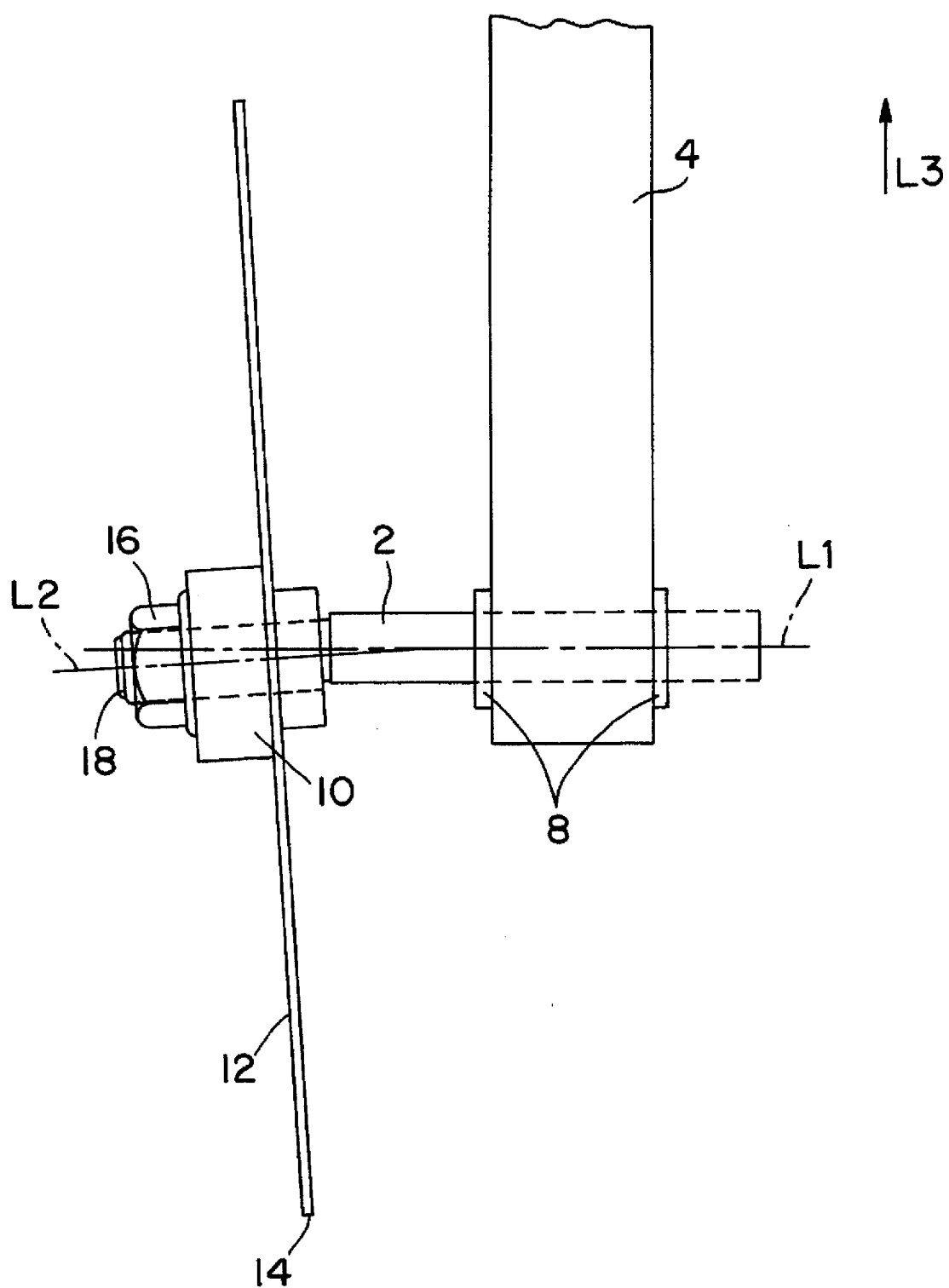
FIG. 1 is a side view of the ground opening device.
Figure 2:
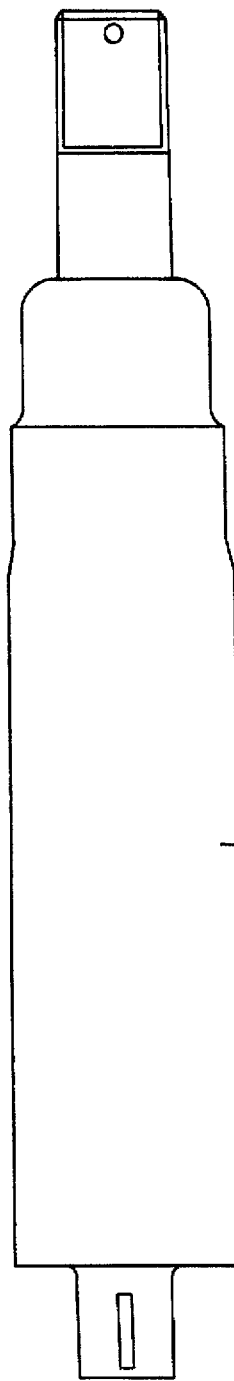
FIG. 2 is a plan view of a shaft or axle.
Figure 3:
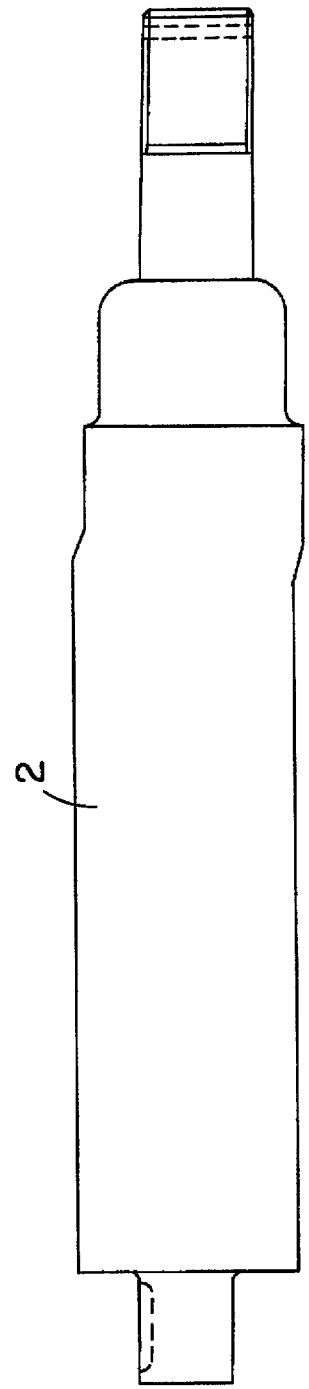
FIG. 3 is a side elevation of a shaft or axle.

Referring to FIG. 1, a shaft 2 is mounted on a drag arm 4 such that the axis L1 of shaft 2 is essentially at right angles to the direction of travel of drag arm 4. Bearings 8 of suitable construction and design can be used to rotatably mount shaft 2 with drag arm 4.

In accordance with known constructions ancillary means can be provided to regulate the height of the drag arm 4 relative to the ground. Alternatively drag arm 4 can be fixed relative to the support or carry frame of the agricultural implement.

A hub 10 is mounted on shaft 2 and mounted with hub 10 is a thin metal disc 12. The peripheral edge 14 of disc 12 forms a cutting edge. In an alternative embodiment disc 12 can be of greater cross-sectional thickness to aid rigidity etc whereupon peripheral edge 14 can be profiled to form the required cutting edge or be of thinner cross-sectioned thickness.

Hub 10 is journalled for free rotation on shaft 2 by the use of suitable bearings (not shown) such as, for example, taper roller bearings. A nut or similar mechanical fastener 16 maintains hub 10 in place on shaft 2.

End portion 18 of shaft 2 on which hub 10 is located has a central axis L2. This axis L2 is offset from and is also inclined at an angle to axis L1 of the main length of shaft 2.

Figure 5:
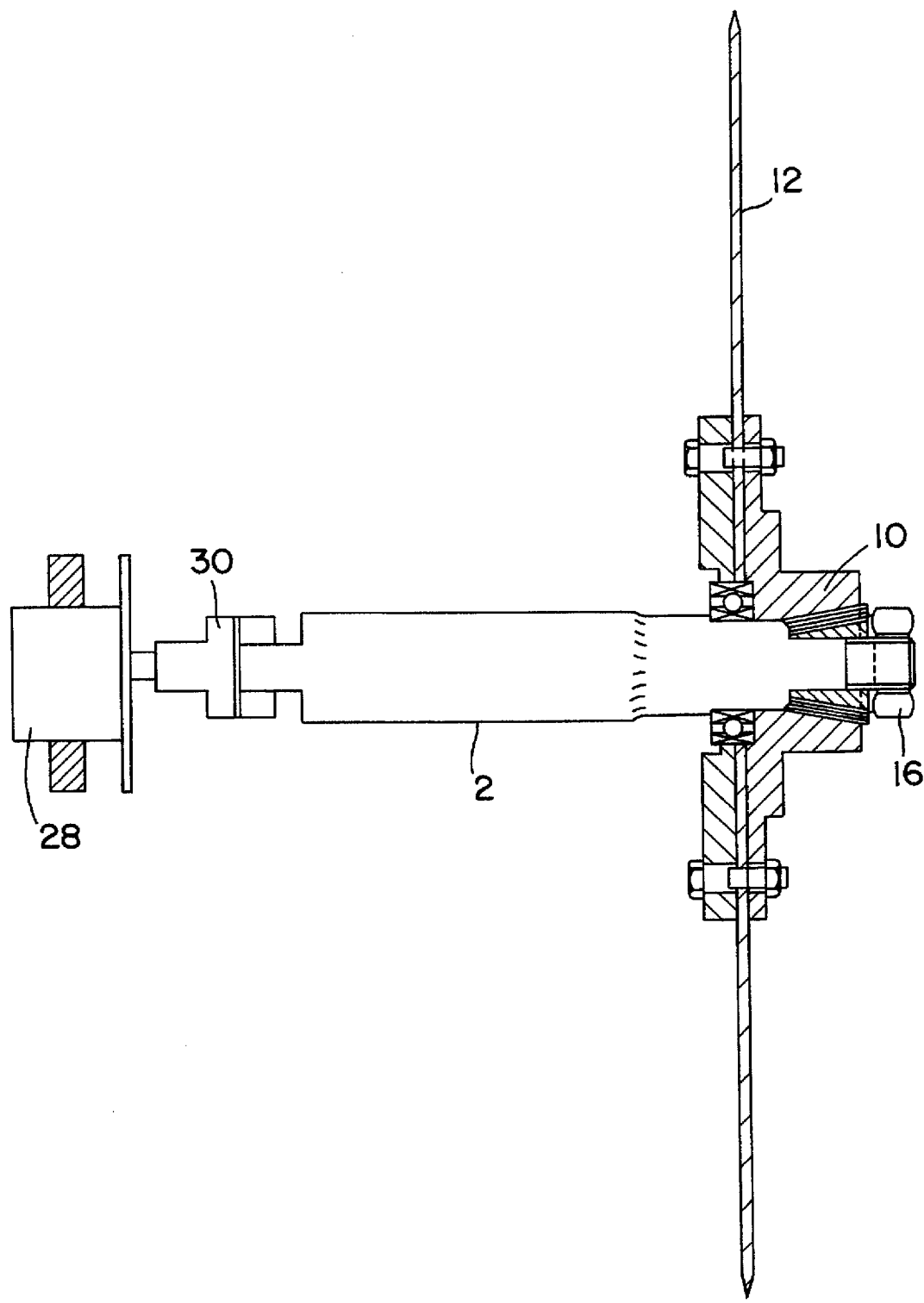
FIG. 5 is a detailed, cross sectional side view of the shaft or axle.

Referring to FIG. 5, a hydraulic motor 28 is directly coupled to the shaft 2 via a flexible universal coupling 30 which accommodates any slight irregularities in alignment. Consequently the shaft 2 is driven at motor speed.

With the drive applied to shaft 2 but with disc 12 not in contact with the ground surface, disc 12 is caused to rotate in the same direction as shaft 2. The direction of rotation of shaft 2 is preferably counter to the direction in which disc 12 would rotate with no drive applied to shaft 2 and the cutting element pulled over the ground (the cutting element being in contact with the ground) by drag arm 4.

When shaft 2 rotates, the disc 12 is caused to oscillate or vibrate in a direction substantially transverse to the direction of movement of drag arm 4. This is due to the disc 12 being set at an angle inclined from the plane perpendicular to the axis L1 of the shaft 2.

In addition, a second oscillation or vibration is imparted to the disc 12. This second oscillation or vibration is in a direction substantially transverse to the first mentioned oscillation or vibration, that is, the second oscillation or vibration is in a direction substantially vertical with respect to the ground surface. This second oscillation or vibration is due to the centre of the disc 12 being offset with respect to the axis L1 of the shaft 2.

In use the speed of rotation of shaft 2 is sufficient that with the cutting element engaged and cutting into the ground the aforementioned oscillations in the two directions take place thus causing the cutting element to vibrate or oscillate transverse to the cut being formed in the ground and vertical to the ground surface. As a consequence of these oscillations or vibrations a cleanly cut channel is formed in the ground with the cut being greater than the cross sectional thickness of the cutting element.

An offset of 2 mm in the shaft gives a movement of 4 mm in the vertical direction. The end of the shaft containing the disc 12 is ¼ degree out of alignment. This gives the disc 12 a transverse movement.

Figure 4:
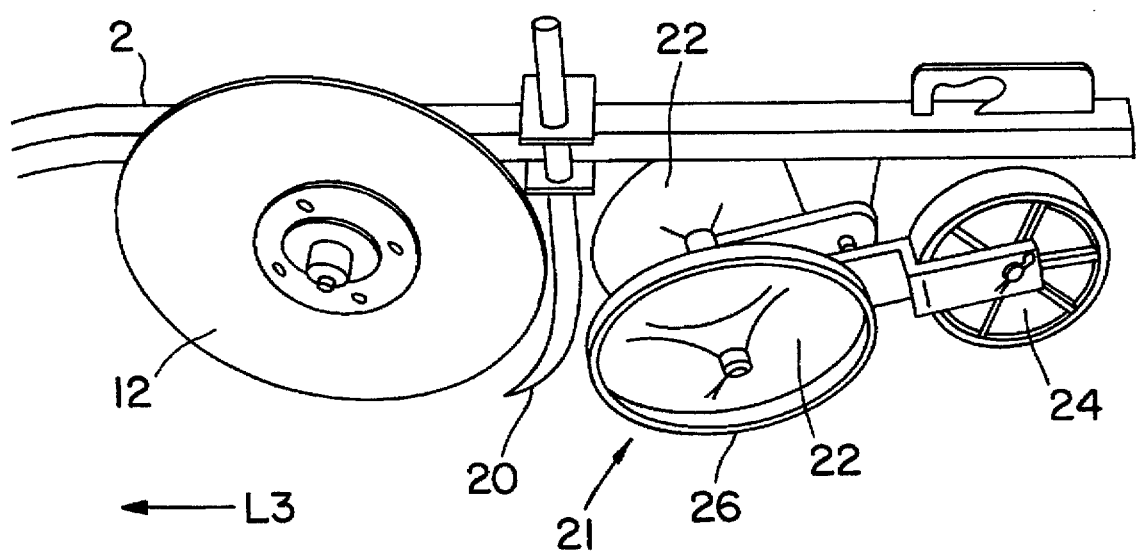
FIG. 4 is a side view of the ground opening device with a compacting means.

Referring now to FIG. 4, a seed sower, fertilizer/pesticide or nutrient feeding means 20 follows behind disc 12 of the ground opening device.

A compacting means 21 follows the sower, fertilizer/pesticide or nutrient feeding means 20. The compacting means 21 comprises two leading wheels 22 and a single trailing wheel 24. The leading wheels 22 are angled towards each other at their ground contacting edges 26. In use, the leading wheels 22 toe out and gather soil towards the groove formed by the disc 12 whilst the third wheel 24 levels or flattens the soil over the groove.

The two leading wheels 22 do not necessarily have to be angled towards each other at their ground contacting edges 26. The angling may not be needed, especially in grassy conditions, when the wheels may be in line. The movement in the rotatable cutting element affects the drag arm 4 which in turn affects the wheels of the compacting means 21. Hence vibration from the rotatable cutting element due to the oscillation in a direction substantially transverse to the groove being formed in the ground and the oscillation in a direction substantially vertical with respect to the ground surface is transmitted to the compacting means.

The front of the drag arm 4 is attached to a towing vehicle via a universal joint. This gives vertical and sideways movement of drag arm 4 allowing the ground opening device to turn around a corner without the disc 12 riding out of the ground and losing its depth.

Tests have shown that a straight sided and clean cut is formed in the turf without any trash burial. This is contrary to previous arrangements where the free running cutting element and its downward pressure does not cut and thus often causes trash to be merely pushed down into the channel in a so called "hair pinning" action. The trash can thus prevent seeds or the like from being placed at the optimum depth within the channel and furthermore can often result in the seed or other material being sprung or forced out of the channel or to a shallow depth prior to the press wheel closing the channel. With the present invention, however, the phenomenon is not observed as the clean cut ensures that a substantially uniform channel is formed in the absence of trash burial.

Furthermore the oscillation or vibration of the cutting element prevents trash build up about the cutting element. Consequently scrapers to prevent trash build up are not required. The absence of such scrapers and the absence of trash build up ensures that the cutting element rotates as it moves through the ground with the direction of rotation being counter to the direction of rotation of shaft 2 but the speed of rotation not being the same as one would expect if the cutting element were freely rotating on shaft 2 as a direct consequence of engagement of the cutting element with the ground. In other words there is a speed differential as well as the vibration/oscillations which result in an effective cutting action.

Another advantage of the present device is that it results in a minimum groove being cut which helps reduce dehydration and/or evaporation.

Also, due to the simultaneous movement in two directions, little extra weight is needed for the cutting element to penetrate the ground.

Suitable shock absorbing mounting of drag arm 4 can be provided as required in order to insulate the main carrying frame or any sub frame from the vibration set up in disc 12.

In a further embodiment a similar free running (but not driven) cutting element spaced from disc 12 on axle 2 could be provided for opening a second and parallel channel. This second channel could be used for receiving fertilizer with the first channel being used to receive seeds. Thus fertilizer could be placed in the ground at the same time as seed sowing yet avoid the undesirable effects of placing fertilizer and seeds in the same channel. The space between the channels would be dictated by the optimum distance required for placement of fertilizer relative to a seed bed. Furthermore this second cutting element might have a stabilizing effect on the arm to counteract the vibration set up by disc 12.

Although the invention has been described with reference to a single ground opening device, it will be appreciated by those skilled in the those skilled in the art that a plurality of ground opening devices could be mounted with or carried by a frame adapted to be towed behind a vehicle such as a tractor.

Furthermore each ground opening device could have associated with it a means of placing seeds and/or other material such as nutrients or herbicides etc into the channel cut by the cutting element. For example, seeds could be placed in the channel by an air seeder or by gravity feed. With the latter arrangement a coulter would generally follow the cutting element, wheel or like rotatable element in order to open up the channel sufficiently for the seed to drop into the channel and be located at the optimum growing depth. Also each opening device would generally have a following press wheel or the like which would press the channel closed.

Although a hydraulic motor is described in the preferred embodiment, it will be appreciated that any motor could be used. The mounting means could be mechanically driven for example, such as by a belt.

Industrail Applicability

The invention may find a wide application in agriculture/farming/horticulture etc. The invention enables clean channels to be cut in soil for the sowing of seed/fertilizer/nutrients/pesticides/insecticides and other substances.

Not only does the opening device provide a clean channel for the reception of seeds or other material but it also provides a good clean cut which can more effectively be closed by the following press wheel.

What I claim is:

1. A ground opening device for traveling along the ground, said device comprising:

a) a rotatable ground engagable cutting element having a cutting edge; and b) a drivable rotatable shaft, said shaft comprising:

i) a main body portion having an axis; and ii) an end portion to which is rotatably mounted said rotatable ground engagable cutting element, said end portion having an axis, said axis of said end portion being offset and inclined with respect to said axis of said main body portion of said drivable rotatable shaft, the offset and inclination of said end portion axis permitting said cutting edge to oscillate in a direction substantially transverse with respect to the direction of travel of said ground opening device, the offset and inclination further permitting said cutting edge to oscillate in a direction substantially vertical with respect to the ground surface during use.

2. The ground opening device recited in claim 1, where said drivable rotatable shaft is driven with its direction of rotation contrary to the direction in which said rotatable ground engagable cutting elements rotates when said rotatable ground engagable cutting element is placed in contact with the ground and drawn therealong from progress of equipment pulling said ground opening device.

3. The ground opening device recited in claim 1, wherein said rotatable ground engagable cutting element is set at an angle inclined from a plane perpendicular to the axis of said main shaft.

4. The ground opening device recited in claim 1, wherein the vertical movement of said rotatable ground engagable cutting element is about 4–4½ mm.

5. The ground opening device recited in claim 1, wherein the transverse movement of said rotatable ground engagable cutting element is about one millimeter mm as measured at said cutting edge.

6. The ground opening device recited in claim 1, wherein the offset between the axis of said main body portion of said drivable rotatable shaft and the axis of said end portion of said drivable rotatable shaft at the point said main body portion of said drivable rotatable shaft meets said end portion of said drivable rotatable shaft is about 2 mm.

7. The ground opening device recited in claim 1, wherein the axis of said end portion of said drivable rotatable shaft, having said rotatable ground engagable cutting element mounted thereon, is ¼ degree out of alignment compared with the axis of said main body portion of said drivable rotatable shaft.

8. A method of forming an opening in the ground comprising the steps of:

drawing over the ground to be opened a ground opening device having a rotatable ground engagable cutting element having a cutting edge and a drivable rotatable shaft, the shaft having a main body portion having an axis and an end portion to which is rotatably mounted the cutting element, the end portion of the shaft having an axis which is offset and inclined with respect to the axis of the main body portion of the shaft, the offset and inclination of the end portion axis permitting the cutting edge to oscillate in a direction substantially transverse with respect to the direction of travel of the ground opening device over the ground, the offset and inclination further permitting the cutting edge to oscillate in a direction substantially vertical with respect to the ground surface during use; and applying downward pressure to the ground opening device sufficient to cause the cutting edge to cut into the ground as the ground opening device passes thereover.

* * * * *